Figure 1:
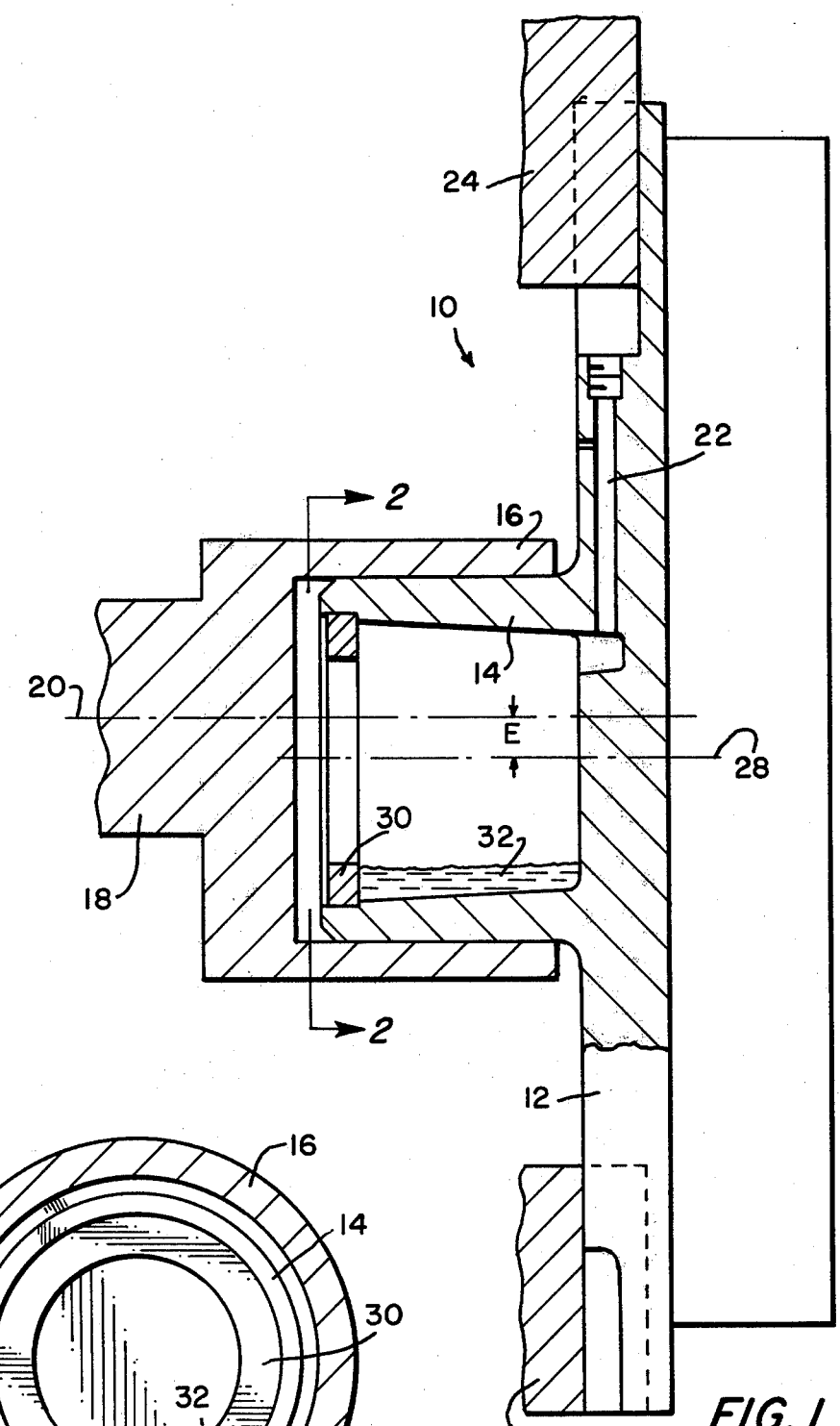

United States Patent [19]

Shaffer

[11] 4,337,984
[45] Jul. 6, 1982

[54] LUBRICATION MEANS FOR A JOURNAL AND BEARING

[75] Inventor: Robert W. Shaffer, Campbellsville, Ky.

[73] Assignee: Ingersoll-Rand Company, Woodcliff Lake, N.J.

[21] Appl. No.: 222,051

[22] Filed: Jan. 2, 1981

[51] Int. Cl.$^3$ .............................................. F16C 33/10
[52] U.S. Cl. .................................... 308/103; 308/62; 308/127
[58] Field of Search ...................... 308/103, 95, 96, 62, 308/127; 418/55, 94, 91

[56] References Cited

U.S. PATENT DOCUMENTS

| 2,937,057 | 5/1960 | Loy | 308/127 |
| 3,964,805 | 6/1976 | Schulien | 308/103 |
| 4,178,143 | 12/1979 | Thelen et al. | 418/55 |

Primary Examiner—Lenard A. Footland
Attorney, Agent, or Firm—B. J. Murphy

[57] ABSTRACT

The invention, according to a depicted embodiment thereof, is incorporated in a scroll-type compressor. The compressor has a drive shaft which terminates in an eccentric socket. The socket, serving as a journal, slidably engages a hollow hub centrally located on the moving or orbiting scroll element. The hub comprises the bearing surface for the shaft socket/journal. A lubricant channel is formed in the orbiting scroll element, and it opens into the hollow of the hub. Lubricant travels, by gravity, from the channel along the inner surfaces of the hub toward the lower side of the hub and socket engaging surfaces. In order that a supply of lubrication will be on hand, with initial start-up of the machine, a ring is fitted into the outer end of the hub to define a dam. The dam wells up with lubricant during a first operation. Thereafter, it displaces lubricant therefrom, with each succeeding start-up of the machine, to the socket and hub interface. Accordingly, even if the compressor lubrication system delays a delivery of lubricant to the channel, the lubricant displaced from the dam is sufficient to prevent galling or seizure of the socket and hub (journal and bearing).

13 Claims, 2 Drawing Figures

LUBRICATION MEANS FOR A JOURNAL AND BEARING

This invention pertains, generally, to lubrication systems for rotating machinery, and in particular to lubrication means for a journal and bearing.

The invention has pertinence for any rotating machinery which employs simple journal bearings. However, to disclose the features of the invention, the problem it solves, and a manner of its practice, it is depicted and described in connection with a scroll-type gas compressor. Of course, this particular application is exemplary only.

In a scroll-type compressor, it is common practice to drive the moving or orbiting scroll through a central, driven hub on the back of the scroll. In order to reduce costs, and to limit space requirements, it is desirable to drive the orbiting scroll thru a journal bearing instead of a rolling-element bearing. The problem with a journal bearing, however, is that of getting sufficient lubricant to the bearing, particularly at start-up of operation, so that it will not gull or seize.

To prevent such journal bearing problems at start-up, it is necessary to have an immediately-applicable supply or reservoir of lubricant fed to the bearing. This is commonly done by either one of two methods: (1) the bearing is partially submerged in an oil bath at all times, even when shut down; (2) the bearing or lubrication system includes an oil pump which operates to supply oil before machine start-up.

Method (1) is not practical since the design of a scroll-type compressor is such that the interengaging journal and bearing both rotate, and offer no area in which to provide a bearing-immersing oil bath. Method (2) is too costly, and would negate the advantage of using a journal bearing.

It is an object of this invention to set forth an improved lubrication means for a journal and bearing which does not involve costly components, and which is simple and efficient in function. It is also an object of this invention to disclose a lubrication means, for a journal and bearing, comprising first means defining a bearing having a bearing surface; and second means defining a shaft; wherein said shaft and bearing are journaled together (a) to effect support of said shaft by said bearing surface, and (b) to accommodate rotation of said shaft relative to said bearing about a given axis; and means for supplying lubrication to said bearing surface; wherein said supplying means includes means formed in one of said first and second means for storing a supply of lubricant on only one side of said given axis.

Figure 2:
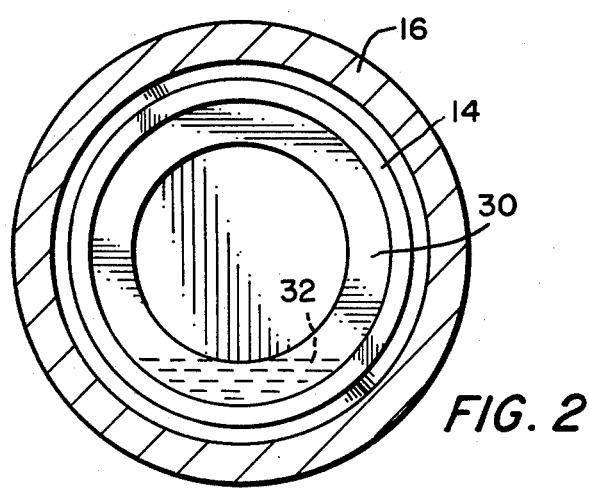

Further objects of this invention, as well as the novel features thereof, will become more apparent by reference to the following description taken in conjunction with the accompanying figures in which:

FIG. 1 is an elevational view, partly cross-sectioned, of an embodiment of the invention, the same shown in use in a portion of a scroll-type, gas compressor apparatus; and FIG. 2 is a cross-sectional view taken along section 2—2 of FIG. 1.

As shown in the figures, a scroll-type compressor 10 (only a portion thereof being shown) comprises an orbiting scroll element 12 which has, projecting centrally therefrom, a hollow hub 14. The hub 14 is slidably engaged with a socket 16 carried by the terminal end of a drive shaft 18. The socket 16 is offset from the axis 20 about which the shaft rotates and, therefore, according to practices well known in the scroll machinery art, causes the scroll element 12 to describe an orbit with an eccentricity indicated by "E".

An upper sector of the scroll element 12 has a channel 22 formed therein through which (by means not shown) lubricant is supplied to the interfacing surfaces of the socket 16 and the hub 14. The scroll-type element 12 engages coupling members 24 and 26 which prevent its rotation about its own axis 28, and constrain it to describe an orbit.

Element 12 orbits about axis 20 in a circle having a radius defined by the eccentricity "E". The coupling members 24 and 26 are only symbolic representations of orbit-constraining couplings. Such couplings are well known in the prior art, particularly from U.S. Pat. No. 3,874,827, for a Positive Displacement Scroll Apparatus with Axially Radially Compliant Scroll Member, issued to Niels O. Young, on Apr. 1, 1975. Thus, detailed disclosure of such here is deemed unnecessary.

Ordinarily, the lubricant flows through the channel 22, through the center of the hub 14, and migrates therefrom to the lower, engaging surfaces of the hub 14 and the socket 16 during normal operation of the machine; this provides adequate lubrication. However, after the compressor 10 has been halted for any period of time and then re-started, there occurs a delay in the provisioning of lubricant to the hub and socket (bearing and journal) surfaces. Accordingly, it is quite possible for the two interfacing surfaces to seize.

According to the invention, in order to insure an adequate supply of lubricant to the hub 14 and socket 16, the outer end of the hub receives an interference-fitted ring 30. The ring defines a lubricant dam 32 within the hub 14. Now, when the compressor 10 is running, it supplies lubricant to channel 22 and to the center of the hub 14. An initial quantity of lubricant is retained by the dam 32, and the surplus lubricant spills over the edge of the dam to lubricate the journal and bearing or socket 16 and hub 14. When the compressor is halted, and it does not matter in which attitude of the scroll member 12, there will always be a sector-shaped reservoir of lubricant in the dam 32. Then, when the compressor 10 has been started up again, and the scroll element 12 proceeds to describe its orbit, it will displace lubricant from the dam 32 to the socket 16 and hub 14 surfaces. The displaced lubricant is sufficient to prevent galling or seizure until the normal or regular supply of lubricant is forthcoming, via channel 22, from the compressor lubrication system.

While I have described my invention in connection with a specific embodiment thereof, it is to be clearly understood that this is done only by way of example and not as a limitation to the scope of my invention as set forth in the objects thereof and in the appended claims. For instance, I show the dam-defining means as a separate, inserted ring 30. Now, clearly, the invention could be practiced by forming the hub 14 with an integral, inwardly-extending lip or rim. Also, in lieu of a ring or lip, a disc could be fastened to the outermost edge of the hub. As noted, the invention comprises the provisioning of an immediately-applicable supply of lubricant for the journal and bearing. In an alternative practice of this object, the socket 16 (i.e. journal) could be formed with a plurality of internal, spaced-apart, axially-extending, shallow grooves. Some of such grooves, upon halting of the machine (compressor), would retain small quantities of lubricant therein (i.e., those grooves which come to be disposed at the lower side, when the machine is at rest). To enhance the displacement of lubricant from the dam 32, on start-up, it may be found advantageous to set a helical element (a spring or the like) in the hub 14, behind the ring 30. Such a helical element, set with the left- or right-handedness of the coils complementary to the orbital direction of the scroll element 12, will "pump" the lubricant out of the dam 32.

The aforesaid, and all other modification and alternative embodiments which will occur to others, proceed from the teachings of may disclosure, and are deemed to be within the ambit of my invention and comprised by the following claims which are drawn thereon.

I claim:

1. Lubrication means for a journal and bearing, comprising:
   first means defining a bearing having a bearing surface; and
   second means defining a shaft; wherein
   said shaft and bearing are journaled together (a) to effect support of said shaft by said bearing surface, and (b) to accommodate rotation of said shaft relative to said bearing about a given axis; and
   means for supplying lubrication to said bearing surface; wherein
   said supplying means includes means formed in one of said first and second means for storing a supply of lubricant on only one side of said given axis;
   said storing means also comprises means defining a reservoir of segment-shaped cross-section;
   said reservoir has an arcuate surface which is eccentric to said given axis;
   said first means has a bearing axis; and
   said arcuate surface is concentric with said bearing axis.

2. Lubrication means for a journal and bearing, according to claim 1, wherein:
   said one means has an axially-extended annulus; and
   said storing means further comprises wall means coupled to said annulus, at least in adjacency to an axial end of said annulus, for storing a supply of lubricant at one side of said wall means.

3. Lubrication means for a journal and bearing, according to claim 2, wherein:
   said wall means extends radially from said annulus.

4. Lubrication means for a journal and bearing, according to claim 2, wherein:
   said wall means comprises a ring.

5. Lubrication means for a journal and bearing, according to claim 4, wherein:
   said annulus has an inner surface; and
   said ring is engaged with said inner surface.

6. Lubrication means for a journal and bearing, according to claim 1, wherein:
   said axes are substantially horizontal, and are spaced apart, in parallelism, from each other.

7. Lubrication means for a journal and bearing, according to claim 2, wherein:
   said one means comprises said bearing; and
   said annulus has an outer surface which comprises said bearing surface.

8. Lubrication means for a journal and bearing, according to claim 1, wherein:
   said storing means further comprises means spaced apart from said bearing surface for retaining a lubricant supply thereat.

9. Lubrication means for a journal and bearing, according to claim 1, wherein:
   said storing means further comprises means defining a dam in said one means.

10. Lubrication means for a journal and bearing, according to claim 9, wherein:
    said shaft has a socket;
    said bearing has a hub;
    said hub and socket are slidably engaged; and
    both said hub and socket have axes which are offset from and parallel with said given axis, whereby rotation of one of said first and second means about said given axis causes (a) rotation of the other of said first and second means about said given axis, and (b) rotary motion of said dam defining means.

11. Lubrication means for a journal and bearing, according to claim 13, wherein:
    rotation of said shaft about said given axis causes said hub axis to describe an orbit about said given axis.

12. Lubrication means for a journal and bearing, according to claim 10, wherein:
    said dam defining means is disposed in said hub.

13. Lubrication means for a journal and bearing, according to claim 10, wherein:
    said hub is engaged within said socket.

* * * * *